United States Patent
Genevrier et al.

(10) Patent No.: US 9,002,616 B2
(45) Date of Patent: Apr. 7, 2015

(54) FULL AUTHORITY DIGITAL ENGINE CONTROL SYSTEM FOR AIRCRAFT ENGINE

(71) Applicant: Thales, Neuilly sur Seine (FR)

(72) Inventors: Gilles Genevrier, Valence (FR); Claude Bresson, Meudon la Foret (FR)

(73) Assignee: Thales, Neuilly sur Seine (FR)

( * ) Notice: Subject to any disclaimer, the term of this patent is extended or adjusted under 35 U.S.C. 154(b) by 0 days.

(21) Appl. No.: 13/671,411

(22) Filed: Nov. 7, 2012

(65) Prior Publication Data

US 2013/0138322 A1     May 30, 2013

(30) Foreign Application Priority Data

Nov. 8, 2011  (FR) ...................... 11 03400

(51) Int. Cl.
*F02D 45/00* (2006.01)
*F02C 9/28* (2006.01)

(52) U.S. Cl.
CPC . *F02D 45/00* (2013.01); *F02C 9/28* (2013.01); *F05D 2260/84* (2013.01); *F05D 2270/46* (2013.01)

(58) Field of Classification Search
CPC . F05D 2270/46; F05D 2260/84; F02D 45/00; F02C 9/28
USPC ........ 701/1, 3, 7, 29.1, 29.6, 29.7, 29.8, 29.9, 701/30.1, 30.2, 30.3, 30.4, 30.5, 30.6, 30.7, 701/30.8, 30.9, 31.1, 31.2, 31.3, 31.4, 31.6, 701/31.7, 32.1, 33.7, 100, 110, 112, 99; 123/353, 354
See application file for complete search history.

(56) References Cited

U.S. PATENT DOCUMENTS

| | | | | |
|---|---|---|---|---|
| 4,500,966 | A * | 2/1985 | Zagranski et al. | 701/116 |
| 4,528,812 | A * | 7/1985 | Cantwell | 60/39.281 |
| 4,947,334 | A * | 8/1990 | Massey et al. | 701/3 |
| 5,121,324 | A * | 6/1992 | Rini et al. | 701/105 |
| 5,363,317 | A * | 11/1994 | Rice et al. | 702/34 |
| 5,948,023 | A * | 9/1999 | Evans et al. | 701/3 |
| 6,321,525 | B1 * | 11/2001 | Rogers | 60/773 |
| 6,578,794 | B1 * | 6/2003 | Clark et al. | 244/75.1 |
| 6,865,458 | B1 * | 3/2005 | Kim | 701/36 |
| 7,983,829 | B2 * | 7/2011 | Muramatsu et al. | 701/100 |
| 8,027,771 | B2 * | 9/2011 | Martini et al. | 701/51 |

(Continued)

FOREIGN PATENT DOCUMENTS

GB         2355081        4/2001

OTHER PUBLICATIONS

Search Report dated Jul. 23, 2012 issued for French Application No. 11 03400.

*Primary Examiner* — Calvin Cheung
*Assistant Examiner* — Angelina Shudy
(74) *Attorney, Agent, or Firm* — Knobbe Martens Olson & Bear LLP

(57) ABSTRACT

In one aspect, a digital engine control system for an aircraft engine is provided. The control system includes a selection unit, the selection unit including a monitoring module configured to determine a measurement of the speed of rotation of the engine from the output signal from one or more protection sensors and to compare the or each speed measurement determined by the selection unit with speed measurements supplied by electronic control units to determine an operating state of each electronic control unit.

14 Claims, 2 Drawing Sheets

(56) References Cited

U.S. PATENT DOCUMENTS

| | | | |
|---|---|---|---|
| 2005/0217273 A1* | 10/2005 | Muramatsu et al. | 60/773 |
| 2005/0217274 A1 | 10/2005 | Muramatsu et al. | |
| 2006/0156715 A1* | 7/2006 | Brome et al. | 60/435 |
| 2009/0209381 A1* | 8/2009 | Ai et al. | 475/5 |
| 2010/0204879 A1* | 8/2010 | Katrak et al. | 701/34 |
| 2011/0239992 A1* | 10/2011 | Metzdorf | 123/488 |
| 2013/0253735 A1* | 9/2013 | Roy et al. | 701/3 |
| 2014/0149020 A1* | 5/2014 | Nakada et al. | 701/110 |

\* cited by examiner

__US 9,002,616 B2__

FULL AUTHORITY DIGITAL ENGINE CONTROL SYSTEM FOR AIRCRAFT ENGINE

BACKGROUND

1. Field of the Invention

The present invention relates to a full authority digital engine control system for an aircraft engine.

2. Description of the Related Technology

Engine control systems are commonly referred to using the acronym FADEC, and are intended to control the engine by controlling the intake, for example, of fuel in an engine such as a helicopter turbine, or any other type of engine such as a reactor, a turbojet engine, etc., intended for other types of aircrafts, for example such as an airplane, an airship, etc.

In fact and generally speaking, these systems fall within the field of electronic engine control units (EECUs), and in particular helicopter turbines.

Traditionally, these control systems are connected on the one hand to a mechanism for controlling various operating parameters of the engine, such as fuel intake or air intake, and on the other hand a mechanism forming speed sensors arranged on the engine.

As a general rule, they comprise at least two redundant electronic control units connected to said mechanism forming speed sensors of the engine and a device for switching between said units as a function of their operating status.

Builders and rules require that the suppliers of this type of equipment respect a certain number of requirements in terms of operating safety.

These requirements for example include parameters such as the MTBF (Mean Time Between Failure), breakdown/flight time level, etc.

For some of the aforementioned FADECs, one of the basic requirements is to have at least two redundant electronic control units to control the fuel intake in the engine, which then makes it possible to continue controlling that engine in the event one of the units fails.

Thus, if the electronic control unit currently operating breaks down, the switching device then triggers the switch from the control of that faulty electronic control unit to the redundant electronic control unit.

However, such devices are not fully satisfactory. In fact, the switching between electronic control units only occurs if the faulty electronic control unit declares itself faulty to the switching device or if the aircraft's pilot detects that failure and orders the switch himself.

Thus, FADECs with a double electronic control unit may fail if the currently operating electronic control unit fails without detecting it and/or without indicating it to the switching device of the FADEC.

In that case, the engine control is not transferred to the redundant electronic control unit and the pilot can only perform that switching manually if he identifies the source of the problem quickly enough.

If this is not the case, the engine may run away, or on the contrary there may be a risk of a loss of power or burnout of the engine.

Most FADECs of this type also frequently have an electronic overspeed protection system (EOSPS) for the emergency cut-off of the turbine to prevent deterioration thereof.

In the first scenario considered above, the electronic protection system then causes a cutoff of the turbine without any possibility of restarting the latter part. One can see that this situation may have serious repercussions.

One aim of the invention is therefore to obtain a full authority digital engine control system for an aircraft engine having improved operating safety and availability.

SUMMARY OF CERTAIN ASPECTS OF THE INVENTION

Aspects of the invention relates to a digital engine control system for an aircraft engine including two redundant electronic control units to control the engine of the aircraft, each electronic control unit being adapted to determine a speed measurement of the engine from an output signal from a respective speed sensor representative of the speed of the engine. The system further includes a selection unit to select one or the other of the electronic control units to control the engine as a function of an operating state of the electronic control units. The system further includes an electronic overspeed protection system to protect the engine of the aircraft from overspeeds, from the output signal from at least one respective protection speed sensor representative of the speed of the engine. The selection unit includes a monitoring module adapted to determine a speed measurement of the engine from the output signal from the or each protection speed sensor and compare the or each speed measurement determined by the monitoring module with the speed measurements supplied by each electronic control unit to determine an operating state of each electronic control unit.

According to another aspect of the invention, the digital engine control system for an aircraft engine comprises one or more of the following features, considered alone or according to all technically possible combinations. The surveillance module may include a respective measurement module associated with each electronic control unit and adapted to determine a speed measurement of the engine from the output signal from at least one protection speed sensor, the monitoring module being adapted to compare the speed measurements supplied by each electronic control unit with the or each speed measurement determined by the associated measuring module. The monitoring module may be adapted to inhibit the selection of an electronic control unit if the electronic control unit does not provide the monitoring module with a speed measurement. The monitoring module may be adapted to inhibit the selection of an electronic control unit if the speed measurement supplied by the electronic control unit over a measurement time period P is not received by the selection unit after a predetermined length of time $\epsilon$ after the beginning of a new measurement time period P, $\epsilon$ for example equal to 1 ms.

The monitoring module may be adapted to inhibit the selection of an electronic control unit if the speed measurement supplied by the electronic control unit is not consistent with two speed measurements determined by the selection unit from output signals from the protection speed sensors, whereas the speed measurements determined by the selection unit are consistent with one another. A speed measurement V1 may be consistent with another speed measurement V2 if $(1-\delta)*V2 \leq V1 \leq (1+\delta)*V2$, $\delta$ being equal to 0.1 for example.

The monitoring module may be adapted to compare the output signals from the control speed sensors and the output signals from the or each protection speed sensor so as to verify the operation of the control speed sensors and/or the or each protection speed sensor.

The monitoring module may be active to inhibit the selection of each electronic control unit only when a predefined number M of speed measurements determined by the monitoring module are representative of a speed of rotation of the engine above a predetermined threshold, for example a fraction of a nominal speed of rotation of the engine, in particular 40%.

The selection unit may include a test mode to test the monitoring module, in which the electronic control units send the monitoring module test signals in place of speed measurements. The test may be implemented only when the speed measurements determined by the monitoring module and the speed measurements determined by the electronic control units are representative of a speed of rotation below a threshold speed of rotation, for example a fraction of a nominal speed of rotation of the engine, in particular 25%. The selection unit may be configurable.

The overspeed protection system may include two redundant control paths to control the overspeed protection system, each control path comprising at least one measurement module for measuring the speed of the engine from the outputs of the protection speed sensors, the monitoring module providing information on the operating state of the overspeed protection system from the outputs of the measuring modules.

The aircraft may be a helicopter. The engine may include a gas turbine stage and/or a free turbine stage. The engine may include two turbine stages, each electronic control unit being adapted to determine a speed of rotation measurement of each turbine stage from an output signal from at least one respective control speed sensor representative of the speed of rotation of each turbine stage of the engine, respectively, the electronic overspeed protection system protecting the engine of the aircraft using the output signal from at least one respective protection speed sensor representative of the speed of rotation of each turbine stage of the engine, respectively, the monitoring module being adapted to determine a speed of rotation measurement of each turbine stage of the engine using the output signal from the or each protection speed sensor and compare the or each speed measurement determined by the monitoring module with the speed measurements provided by each electronic control unit to determine an operating state of each electronic control unit.

BRIEF DESCRIPTION OF THE DRAWINGS

The invention will be better understood using the following description, provided solely as an example and done in reference to the appended figures, in which.

DETAILED DESCRIPTION OF CERTAIN INVENTIVE EMBODIMENTS

In the present description, the term "engine" must be understood in its general sense to designate the turbine, turbine stage, reactor, turbojet engine, or other mechanism, for example, designed to equip an aircraft, this term also generally for example designating a helicopter, an airplane, an airship, or other devices.

Furthermore, the expression "speed of rotation of the engine" refers indifferently to the frequency of rotation or revolving period thereof.

Figure 1:
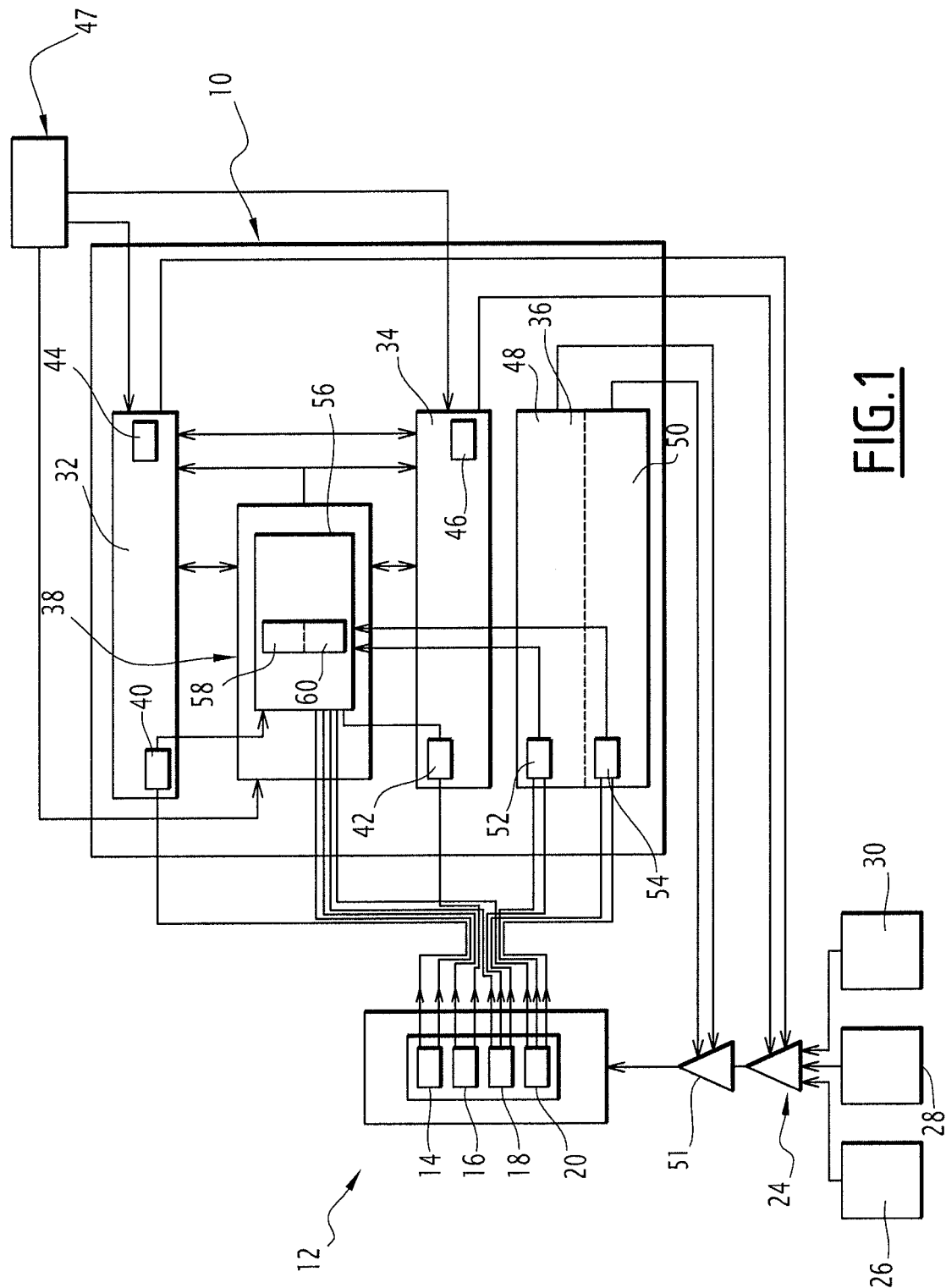
FIG. 1 shows a summary diagram illustrating the structure and operation of a full authority digital engine control system for an aircraft engine according to the invention.

The full authority digital engine control system 10 for an aircraft engine 12 shown in FIG. 1, hereafter "control system," is connected in input to speed sensors 14, 16, 18, 20 arranged on the engine 12 and in output to mechanism 24 for controlling the parameters of the engine 12.

Each speed sensor 14, 16, 18, 20 provides an output signal representative of the speed of rotation of the engine 12.

In the example of FIG. 1, the sensors 14, 16, 18, 20 used are electromagnetic frequency sensors each associated with a phonic wheel that send the members of the control system 10 a frequency signal representative of the speed of rotation of a free turbine stage or a gas turbine stage comprised by the engine 12.

The parameters controlled by the control mechanism 24 are for example the fuel intake 26 in the engine 12, the air intake 28, the actuation of discrete accessories 30 associated with the operation of the engine 12, etc.

The control system 10 comprises two redundant electronic control units 32, 34, an electronic overspeed protection system 36, hereafter EOSPS 36, as well as a selection unit 38 for selecting one or the other of the electronic control units 32, 34 to control the engine 12.

Each of the electronic control units 32, 34, the EOSPS 36, and the selection unit 38 is autonomous with respect to the others, having its own power supply and computation unit.

Each electronic control unit 32, 34 can control the engine 12 alone.

Each electronic control unit 32, 34 comprises a measuring module 40, 42 to measure the speed of rotation of the engine 12 and an auto-monitoring module 44, 46.

Optionally, the auto-monitoring module 44, 46 of each electronic control unit 32, 34 is a completely separate module to which the electronic control unit 44, 46 is connected.

Each electronic control unit 32, 34 is connected to the selection unit 38, the other electronic control unit 32, 34, the control mechanism 24 of the engine parameters, and an external module 47.

The external module 47 can emit an external selection signal to the selection unit 38 and the electronic control units 32, 34. The signal predetermines the electronic control unit 32, 34 in charge of controlling the engine 12 when both electronic control units 32, 34 are capable of controlling the engine or the selection unit 38 fails, as will be seen hereafter.

The measuring module 40, 42 of each electronic control unit 32, 34 is connected to the output of a respective speed sensor 14, 16, hereafter "control speed sensor 14, 16."

The measuring module 40, 42 of each electronic control unit 32, 34 can determine a speed measurement from the output signal of the associated control speed sensor 14, 16.

As illustrated in FIG. 1, the measuring module 40 of the first electronic control unit 32 is connected to the output of the first control speed sensor 14 and the measuring module 42 of the second electronic control unit 34 is connected to the second control speed sensor 16.

The output signal of the control speed sensor 14, 16 is converted by the associated measuring module 40, 42 into a measurement NTLx of the speed of rotation of the engine 12 equal to NTLx=NTL/Nx, NTL being the actual speed of rotation of the engine 12, and Nx a scaling factor depending on the number of teeth of the corresponding control speed sensor 14, 16.

In practice, NTL is proportional to the speed of rotation of a stage of the engine 12, as described above. NTL therefore depends on the scaling between the speeds of rotation of the stages of the engine 12 and the speed of rotation of the shaft of the engine 12 on which the sensor is mounted. The parameter Nx is specific to a phonic wheel comprised by the sensor.

From the speed measurement, the operating electronic control unit 32, 34 controls the operation of the engine 12.

In the control system 10 according to the invention, the measuring modules 40, 42 for measuring the speed of each electronic control unit 32, 34 are also adapted to periodically measure, with a frequency P, the speeds T(NTLR1) and T(NTLR2) respectively defined by:

$$T(NTLR1)=NmesR1*NTLR1/NDR1 \text{ and}$$

$$T(NTLR2)=NmesR2*NTLR2/NDR2,$$

NmesR1 and NmesR2 being the numbers of inter-tooth spaces of the control speed sensors 14, 16 on which the measurements are done, and NDR1 and NDR2 being the ratios between the revolving period of the engine 12 and the inter-tooth period of the corresponding speed sensor 14, 16.

These measurements are done with a sampling clock with a high enough frequency to obtain sufficiently precise measurements, for example 10 Mhz, and with a period P for example equal to 20 ms.

The auto-monitoring module 44, 46 of each electronic control unit 32, 34 serves to deliver status information of the electronic control unit 32, 34 to the selection unit 38.

The auto-monitoring module 44, 46 is adapted to deliver independent signals to the selection unit 38 to indicate various causes of malfunctions, for example hardware or software, or to indicate various degrees of unavailability, for example deteriorated control capacity or total inability to control.

The electronic overspeed protection system 36 (EOSPS 36) can verify that the speed of rotation of the engine 12 remains below a given maximum speed.

The maximum speed of rotation is supplied by the builder and is an operating limit beyond which the engine 12 may be damaged, possibly permanently.

The EOSPS 36 comprises two redundant control paths 48, 50 that are connected in output to a member 51 of the solenoid valve type situated downstream of the control mechanism 24. This member 51 can cut off the fuel intake 26 into the engine 12.

Each control path 48, 50 comprises a measuring module 52, 54 for measuring the speed connected to the output of the speed sensors 18, 20, hereafter "protection speed sensors 18, 20."

As illustrated in FIG. 1, each control path 48, 50 is connected to the two protection speed sensors 18, 20, separate from the control speed sensors 14, 16.

If the speed of rotation of the engine 12 measured by the control paths 48, 50 of the EOSPS 36 exceeds the maximum speed, the EOSPS 36 then orders the member 51 to extinguish the engine 12, which then cuts off the fuel intake 26.

The selection unit 38 can select either of the electronic control units 32, 34 as a function of the status signal supplied by the auto-monitoring modules 44, 46 of the electronic control units 32, 34, the external selection signal supplied for the external module 47, and the output of a monitoring module 56 it comprises, as will be seen hereafter.

The selection unit 38 can also monitor the electronic control units 32, 34.

To that end, it comprises a monitoring module 56 for monitoring the electronic control units 32, 34.

The monitoring module 56 can verify the consistency of the output signals emitted by each of the speed sensors 14, 16, 18, 20 and monitor the operation of the electronic control units 32, 34.

To that end, the monitoring module 56 is connected in input to the outputs of the control speed sensors 14, 16 and protection speed sensors 18, 20 and the outputs of the measuring modules 40, 42 of each electronic control unit 32, 34. The monitoring module 56 also comprises two measuring modules 58, 60 to measure the speed of rotation of the engine 12 that are connected to the output of the protection speed sensors 18, 20, each measuring module 58, 60 being dedicated to one of the two electronic control units 32, 34.

On the one hand, the monitoring module 56 verifies that the outputs of the protection speed sensors 18, 20 are consistent with the outputs of the control speed sensors 14, 16, and consequently that the protection speed sensors 18, 20 used by the EOSPS 36 are working.

On the other hand, the monitoring module 56 monitors the operation of the electronic control units 32, 34 by cyclically diagnosing each of the electronic control units 32, 34.

To that end, each measuring module 58, 60 of the monitoring module 56 performs speed measurements NTLS1 and NTLS2 of the speed of rotation of the engine 12 from outputs of the protection speed sensors 18, 20.

For each period with length P, these measuring modules 58, 60 also perform measurements of the speeds T(NTLS1) and T(NTLS2) respectively defined by:

$$T(NTLS1)=NmesS1*NTLS1/NDS1, \text{ and}$$

$$T(NTLS2)=NmesS2*NTLS2/NDS2,$$

NmesS1 and NmesS2 being the numbers of inter-tooth spaces of the protection speed sensors 18, 20 on which the measurements are done, and NDS1 and NDS2 being the ratios between the revolving period of the engine 12 and the inter-tooth period of the corresponding protection speed sensor 18, 20.

The monitoring module 56 then compares the speeds T(NTLR1) and T(NTLR2) taken over a period P by the measuring modules 40, 42 of the electronic control unit 32, 34 with the periods T(NTLS1) and T(NTLS2) done by the measuring modules 58, 60 of the monitoring module 56.

The operation of the monitoring module 56 will now be described in relation to the first electronic control unit 32.

During a period P, the measuring module 40 of the first electronic control unit 32 measures the speed NTLR1 and the corresponding speed T(NTLR1) from the output of the control speed sensor 14 to which it is connected.

Over the course of that same period, the measuring module 58 associated with the electronic control unit 32 performs the speed NTLS1 and NTLS2 and corresponding T(NTLS1) and T(NTLS2) measurements from the output of the protection speed sensors 18, 20 to which it is connected.

At the end of this period P, the measurement T(NTLR1) is communicated by the computation unit of the electronic control unit 32 to the monitoring module 56.

The beginning of the writing by the electronic control module 32 in the monitoring module 56 triggers a new measurement of T(NTLR1) by the electronic control unit 32.

Once the previous measurement T(NTLR1) has been completely communicated to the monitoring module 56, the latter uses the speed T(NTLR1) and the speeds T(NTLS1) and T(NTLS2) measured during the previous period to make the following comparisons:

$$0.9*T(NTLS1)<T(NTLR1)<T(NTLS1)*1.1,$$

$$0.9*T(NTLS2)<T(NTLR1)<T(NTLS2)*1.1, \text{ and}$$

$$0.9*T(NTLS1)<T(NTLS2)<T(NTLS1)*1.1.$$

These comparisons are so-called "consistency" comparisons, a speed measurement V1 being consistent with a speed measurement V2 if $(1-\delta)*V2 \leq V1 \leq (1+\delta)*V2$. In the embodiment of FIG. 1, $\delta$ is equal to 0.1.

If the first inequality is true, the measurement NTLR1 is then consistent with the measurement NTLS1.

If the second inequality is true, the measurement NTLR1 is then consistent with the measurement NTLS2.

If the third inequality is true, the measurement NTLS2 is then consistent with the measurement NTLS1.

The monitoring module 56 is adapted to declare the electronic control unit 32 faulty to the selection unit 38 if:
- the electronic control unit 32 does not provide a measurement NTLR1 during the period P, or
- NTLR1 is not consistent with NTLS1 or NTLS2 whereas NTLS2 is consistent with NTLS1 and the associated control speed sensor 14 is operational, or
- the electronic control unit 32 has not communicated the measurement T(NTLR1) done during the previous period at the end of a time ε after the beginning of a new measuring period.

In the example of FIG. 1, ε is equal to 1 ms.

Likewise, the monitoring module 56 is adapted then to declare the second electronic control unit 34 faulty to the selection unit 38 if:
- the electronic control unit 34 does not provide a measurement NTLR2 during the period P, or
- NTLR2 is not consistent with NTLS1 or NTLS2 whereas NTLS2 is consistent with NTLS1 and the control speed sensor 16 is operational, or
- the electronic control unit 34 has not communicated the measurement T(NTLR2) done during the previous period at the end of the time ε after the beginning of a new measuring period.

By declaring an electronic control unit 32, 34 faulty, the monitoring module 56 prohibits the selection of the electronic control unit 32, 34 and therefore inhibits its selection by the selection unit 38.

When the monitoring module 56 does not inhibit the selection of an electronic control unit 32, 34 and none of the electronic control units 32, 34 have declared themselves to be faulty, the selection unit 38 selects the predetermined electronic control unit 32, 34 by the external selection signal it receives from the external module 47.

When the monitoring module 56 declares electronic control unit 32, 34 currently in use to be faulty to the selection unit 38, the latter orders the switch from the operating electronic control unit 32, 34 to the redundant electronic control unit 32, 34 if the latter is available.

In the event both electronic control units 32, 34 are faulty, the operating electronic control unit 32, 34 is determined by default by the external selection signal emitted by the external module 47.

The monitoring module 56 in a control system 10 according to the invention thus allows a cyclic diagnosis of the electronic control unit 32, 34.

This diagnosis is done completely independently of the auto-monitoring modules 44, 46 of each of the electronic control units 32, 34.

During a silent failure of the electronic control unit 32, 34 currently in control of the control mechanism 24, the monitoring module 56 still detects that failure and the selection unit 38 then orders the switch of the selection to the redundant electronic control unit 32, 34; the control system 10 according to the invention is thus no longer faulty when an electronic control unit 32, 34 is faulty without declaring it to the selection unit 38.

One can then see that the robustness and availability of the control system 10 according to the invention are considerably increased.

By performing cyclic monitoring of the electronic control units 32, 34, the monitoring module 56 simultaneously diagnoses the capacity of the various computation units of the control system 10 to perform measurement acquisitions, conduct elaborate competitions, and perform a complex sequence of tasks.

So as not to disrupt the operation of the selection unit 38, the monitoring module 56 can diagnose the electronic control unit 32, 34 only when a predefined number M of consecutive measurements of the speeds NTLS1 and NTLS2 are above a predefined percentage of the speed of rotation of the engine 12. This in particular makes it possible to prevent switching from one electronic control unit 32, 34 toward the redundant unit when the turbine is in the intermediate rating, for example when it is being ignited or extinguished.

In the example of FIG. 1, this percentage is considered to be equal to 40% of the nominal speed of the engine 12.

So as to be adaptable to all types of turbines and all types of stresses to which an aircraft may be subjected, the monitoring module 56 also has a configuration mode.

This mode is used to adjust the operation of the monitoring module 56 to various types of sensors, frequency sensors having different characteristics, different real-time stresses applied to the airplane, etc.

This configuration mode for example makes it possible to adjust the speed threshold below which a test mode of the selection unit 38 may be activated, as will be seen hereafter, or the number M of successive measurements of the speeds NTLS1 and NTLS2 needed to activate the monitoring of the electronic control units 32, 34.

Optionally, the monitoring module 56 is also adapted to monitor the control paths 48, 50 of the EOSPS 36.

To that end, the monitoring module 56 is connected to the outputs of the measuring modules 52, 54 of each of the control paths 48, 50 of the EOSPS.

The consistency comparisons between the speed measurements done by the control paths 48, 50 during diagnosis and the measurements done by the measuring modules 58, 60 of the monitoring module 56 are done in the same way as in the case of an electronic control unit 32, 34, a measuring module 58, 60 being dedicated to each control path 48, 50 of the EOSPS 36.

As a function of the results of these consistency comparisons, if one of the control paths 48, 50 is diagnosed as being faulty by the monitoring module 56, the latter then provides the pilot or maintenance personnel with operating status information regarding the EOSPS 36, for example the one of the control paths 48, 50 is faulty, the EOSPS 36 is operating in degraded mode, maintenance is required, etc.

It should be noted that aeronautic safety and security regulations require that the operation of the EOSPS 36 be independent from the control system 10. As a result, the monitoring module 56 diagnoses the EOSPS 36, but cannot modify its operation.

The robustness of the selection unit 38 is ensured by robustness criteria that must be met by status changes on one or more inputs of the selection unit 38 for the switch toward the redundant control unit 32, 34 to take place.

These criteria are the following:
- the selection change of the electronic control unit 32, 34 must take place no later than after a predefined time period beginning upon the change of an input status of the selection unit 38,
- an input status change is only taken into account if the new status on that input is constant over a minimum length of time, and
- the conditions leading to this modification of the selection are maintained for a minimum length of time.

In the example FIG. 1, the selection unit 38 is adapted so as to:

modify the selection no later than 500 ms after a change of input status, only switch to a redundant electronic control unit 32, 34 if the new input status is maintained for at least 10 ms and if the conditions leading to the selection are maintained for at least 100 ms.

In practice, the result of the selection is accessible in read mode by the electronic control units 32, 34 via a bus to which they are connected. The selection unit 38 then sends the results of the selection to the two electronic control units 32, 34 using a bit sequence coding the selected electronic control unit 32, 34.

In the example of FIG. 1, the sequence "10101" codes the selection of the first electronic control unit 32, and the sequence "11011" for example codes the selection of the second electronic control unit 34.

Furthermore, the selection unit 38 can be diagnosed by the electronic control units 32, 34.

To that end, each electronic control unit 32, 34 is connected to the inputs of the selection unit 38.

In the example of FIG. 1, these inputs are accessible in read mode by the electronic control units 32, 34 via a serial bus to which they are connected. The transmission method used is of the differential type and is based on coding of the 8 bit/10 bit type. This method allows the use of an isolation transformation between each of the electronic control units 32, 34 and the selection unit 38 as well as coverage of transmission errors.

Each electronic control unit 32, 34 therefore has access both to the input and output of the selection unit 38. They then communicate to compare the information received from the selection unit 38 and verify the consistency between the statuses of the inputs of the selection unit 38 and the result of the selection.

The selection unit 38 also comprises an exhaustive test mode during which the monitoring module 56 is also tested.

This so-called "intrusive" test takes place during the start-up phase of the engine 12, for example when the speeds measured by the different members of the control system 10 are all below a predefined value of the nominal speed of the engine 12, for example 25%.

The electronic control units 32, 34 then emit, to the selection unit 38, sequences of coordinated signals corresponding to various expected selection results from the selection unit 38. The outputs of the selection unit 38 are then compared by the two electronic control units 32, 34 to determine the operating state of the selection unit 38.

Furthermore, the frequency signals from the speed sensors 14, 16, 18, 20 are replaced by test signals generated by the selection unit 38 so as to test the behavior of the monitoring module 56.

During this intrusive test, the electronic control modules 32, 34 are authorized to write in the selection unit 38 to modify the operation thereof.

In the event of a breakdown of the selection unit 38 detected by the electronic control units 32, 34, the electronic control unit 32, 34 currently in control is determined by the external selection signal emitted by the external module 47.

In practice, the selection unit 38 is segregated from the two electronic control units 32, 34.

The selection unit 38 is thus mechanically and/or electrically isolated from the two electronic control units 32, 34. It also has an independent or consolidated electricity source from the power supplies for each of the electronic units 32, 34.

The selection unit 38 has its own clock source independent from the clock sources used in the electronic units and does not use phase-lock loop (PLL) devices to avoid oscillations on frequencies specific to the phase loop.

Figure 2:
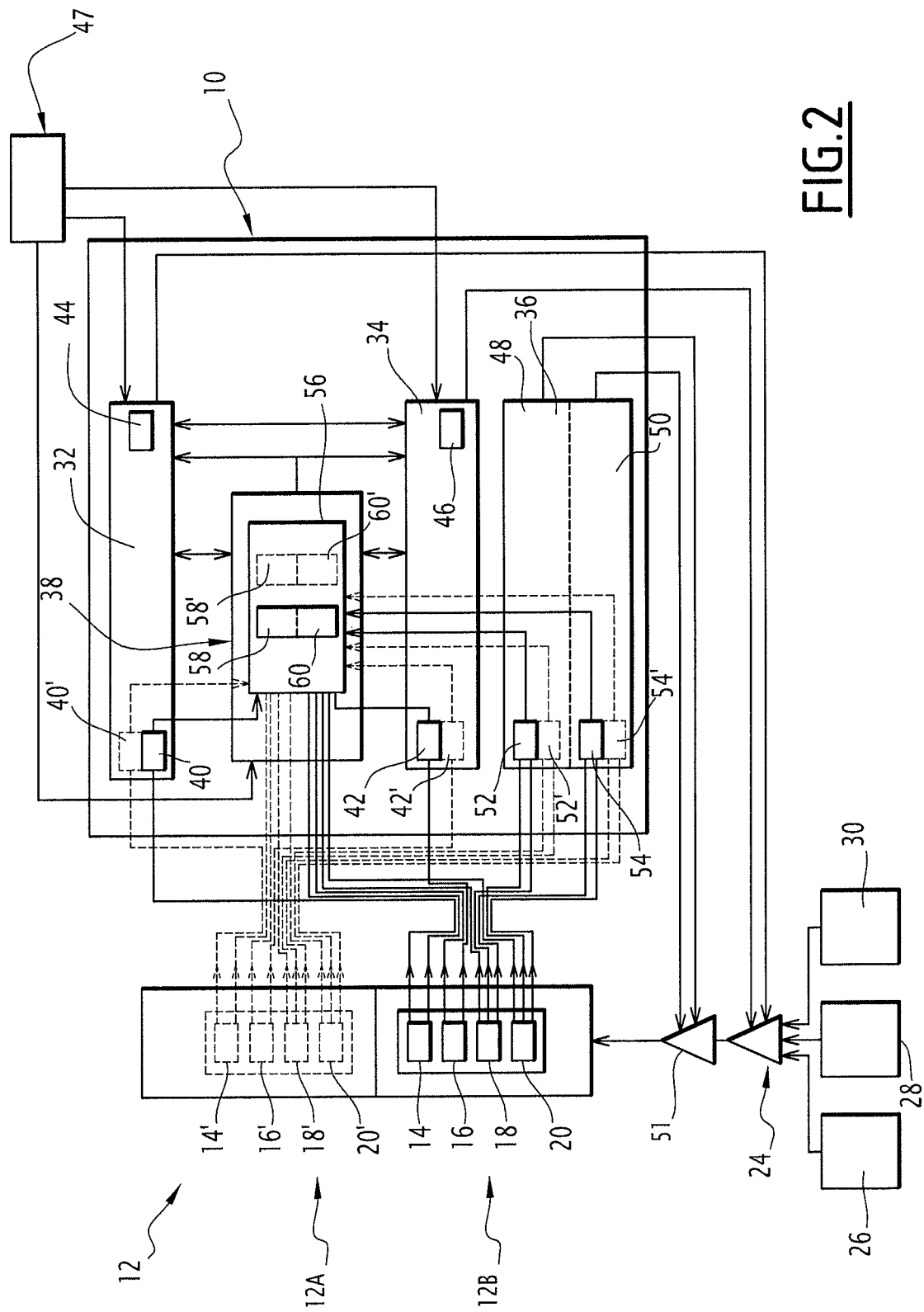
FIG. 2 shows a summary diagram illustrating the structure and operation of the full authority digital engine control system for an aircraft engine according to one alternative of the invention.

Optionally, in reference to FIG. 2, the control system 10 can simultaneously control both a free turbine stage 12B and a gas turbine stage 12A comprised by the engine 12, the stages having speeds of rotation that are independent of one another.

To that end, aside from the members of the control system 10 adapted to control a single turbine stage illustrated in FIG. 1, the control system 10 according to this alternative of the invention comprises the following features.

The electronic control units 32, 34 respectively comprise measuring modules 40', 42' supplying measurements of the speed of rotation of the second stage 12A controlled from the outputs of control speed sensors 14', 16' arranged in contact with said second stage 12A.

Furthermore, each path 48, 50 of the EOSPS 36 respectively comprises a speed measuring module 52', 54' from the outputs of two protection speed sensors 18', 20' arranged on the second turbine stage 12A. The EOSPS 36 then commands the cut-off of the fuel intake 26 by the member 51 when one of the speed measurements of one of the stages 12A, 12B of the motor 12 is above a set threshold value.

Furthermore, the monitoring module 56 is connected to the outputs of the sensors 14', 16', 18', 20' and comprises two speed measuring modules 50', 60' each connected to the outputs of two protection speed sensors 18', 20'.

The monitoring module 56 then cyclically diagnoses the capacity of the electronic control units 32, 34 to regulate the two turbine stages 12A, 12B at the same time by performing the consistency comparisons for each of the turbine stages 12A, 12B from the outputs of the corresponding measuring modules 40, 40', 42, 42', 58, 58', 60, 60' and the outputs of the speed sensors of the two turbine stages 12A, 12B.

Furthermore, the monitoring module 56 can give the pilot or personnel operating status information of the EOSPS 36 from the outputs of the speed measuring modules 52, 52', 54, 54' of the control paths 48, 50 and the outputs of the protection speed sensors 18, 18', 20, 20'.

Also optionally, the monitoring module 56 performs the diagnosis of the electronic control units 32, 34 from the outputs of any number of control and protection speed sensors arranged on the free 12B and gas 12A turbine stages of the engine 12, each turbine stage of the engine 12 having, if the or each corresponding control speed sensor is present, a dedicated:

speed measuring module 52, 52', 54, 54' for measuring the speed by control path 48, 50 of the EOSPS 36, measuring module 40, 40', 42, 42' for measuring the speed by electronic control unit 32, 34, and at least one speed measuring module 58, 50', 60, 60' for the monitoring module 56.

For example, the free 12B and gas 12A turbine stages of the engine 12 can be controlled simultaneously by the control system 10 according to the invention from a control speed sensor supplying information representative of the speed of rotation of the free turbine stage 12B, and a control speed sensor and two protection speed sensors providing information representative of the speed of rotation of the gas turbine stage 12A of the engine 12.

While there have been shown and described and pointed out the fundamental novel features of the invention as applied to certain inventive embodiments, it will be understood that the foregoing is considered as illustrative only of the principles of the invention and not intended to be exhaustive or to limit the invention to the precise forms disclosed. Obvious modifications or variations are possible in light of the above teachings. The embodiments discussed were chosen and described to provide the best illustration of the principles of the invention and its practical application to enable one of ordinary skill in the art to utilize the invention in various embodiments and with various modifications as are suited to the particular use contemplate. All such modifications and variations are within the scope of the invention as determined by the appended claims when interpreted in accordance with the breadth to which they are entitled.

What is claimed is:

1. A digital engine control system for an aircraft engine comprising:
   two redundant electronic control units configured to control the engine of the aircraft, each electronic control unit being configured to determine a speed measurement of the engine from an output signal from a respective speed sensor representative of the speed of the engine;
   a selection unit configured to select one or the other of the electronic control units to control the engine as a function of an operating state of the electronic control units; and
   an electronic overspeed protection system configured to protect the engine of the aircraft from overspeeds, from the output signal from at least one respective protection speed sensor representative of the speed of the engine, wherein the selection unit comprises a monitoring module configured to determine a speed measurement of the engine from the output signal from the or each protection speed sensor and compare the or each speed measurement determined by the monitoring module with the speed measurements supplied by each electronic control unit to determine an operating state of each electronic control unit, and wherein the monitoring module is configured to inhibit the selection of an electronic control unit while the electronic control unit does not provide the monitoring module with a speed measurement.

2. The system of claim 1, wherein the surveillance module comprises a respective measurement module associated with each electronic control unit and configured to determine a speed measurement of the engine from the output signal from at least one protection speed sensor, the monitoring module being configured to compare the speed measurements supplied by each electronic control unit with the or each speed measurement determined by the associated measuring module.

3. The system of claim 1, wherein the monitoring module is configured to inhibit the selection of an electronic control unit while the speed measurement supplied by the electronic control unit over a measurement time period (P) is not received by the selection unit after a predetermined length of time $\epsilon$ after the beginning of a new measurement time period (P).

4. The system of claim 1, wherein the monitoring module is configured to inhibit the selection of an electronic control unit while the speed measurement supplied by the electronic control unit is not consistent with two speed measurements determined by the selection unit from output signals from the protection speed sensors, whereas the speed measurements determined by the selection unit are consistent with one another.

5. The system of claim 4, wherein a speed measurement V1 is consistent with another speed measurement V2 while $(1-\delta)*V2 \leq V1 \leq (1+\delta)*V2$, $\delta$ is equal to 0.1.

6. The system of claim 1, wherein the monitoring module is configured to compare the output signals from the control speed sensors and the output signals from the or each protection speed sensor so as to verify the operation of the control speed sensors or the or each protection speed sensor.

7. The system of claim 1, wherein the monitoring module is configured to inhibit the selection of each electronic control unit only when a predefined number M of speed measurements determined by the monitoring module are representative of a speed of rotation of the engine above a predetermined threshold based at least in part on a fraction of a nominal speed of rotation of the engine.

8. The system of claim 1, wherein the selection unit comprises a test mode to test the monitoring module, in which the electronic control units send the monitoring module test signals in place of speed measurements.

9. The system of claim 8, wherein the test is implemented only when the speed measurements determined by the monitoring module and the speed measurements determined by the electronic control units are representative of a speed of rotation below a threshold speed of rotation based at least in part on a fraction of a nominal speed of rotation of the engine.

10. The system of claim 1, wherein the selection unit is configurable.

11. The system of claim 1, wherein the overspeed protection system comprises two redundant control paths configured to control the overspeed protection system, each control path comprising at least one measurement module configured to measure the speed of the engine from the outputs of the protection speed sensors, the monitoring module providing information on the operating state of the overspeed protection system from the outputs of the measuring modules.

12. The system of claim 1, wherein the aircraft is a helicopter.

13. The system of claim 1, wherein the engine comprises a gas turbine stage or a free turbine stage.

14. The system of claim 1, wherein the engine comprises two turbine stages, each electronic control unit being configured to determine a speed of rotation measurement of each turbine stage from an output signal from at least one respective control speed sensor representative of the speed of rotation of each turbine stage of the engine, respectively, the electronic overspeed protection system protecting the engine of the aircraft using the output signal from at least one respective protection speed sensor representative of the speed of rotation of each turbine stage of the engine, respectively, the monitoring module being configured to determine a speed of rotation measurement of each turbine stage of the engine using the output signal from the or each protection speed sensor and compare the or each speed measurement determined by the monitoring module with the speed measurements provided by each electronic control unit to determine an operating state of each electronic control unit.

* * * * *